United States Patent
McDonald et al.

(10) Patent No.: US 11,226,910 B2
(45) Date of Patent: Jan. 18, 2022

(54) TICKET BASED REQUEST FLOW CONTROL

(71) Applicant: QUALCOMM Incorporated, San Diego, CA (US)

(72) Inventors: Joseph Gerald McDonald, Raleigh, NC (US); Garrett Michael Drapala, Cary, NC (US); Eric Francis Robinson, Raleigh, NC (US); Thomas Philip Speier, Wake Forest, NC (US); Kevin Neal Magill, Durham, NC (US); Richard Gerard Hofmann, Cary, NC (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/808,073

(22) Filed: Mar. 3, 2020

(65) Prior Publication Data

US 2020/0285597 A1 Sep. 10, 2020

Related U.S. Application Data

(60) Provisional application No. 62/813,542, filed on Mar. 4, 2019.

(51) Int. Cl.
*G06F 13/20* (2006.01)
*G06F 9/48* (2006.01)

(52) U.S. Cl.
CPC .......... *G06F 13/20* (2013.01); *G06F 9/4881* (2013.01); *G06F 2209/486* (2013.01)

(58) Field of Classification Search
CPC . H04L 47/00–41; G06F 3/0659; G06F 13/20; G06F 9/4881; G06F 2209/486
USPC ........................................ 710/6, 29
See application file for complete search history.

(56) References Cited

U.S. PATENT DOCUMENTS

| | | | |
|---|---|---|---|
| 5,805,837 A | 9/1998 | Hoover et al. | |
| 6,298,407 B1* | 10/2001 | Davis | G06F 13/4054 710/314 |
| 2006/0010451 A1* | 1/2006 | Lenk | G06F 9/52 718/105 |
| 2009/0070507 A1 | 3/2009 | Asano et al. | |
| 2015/0249515 A1* | 9/2015 | Wu | H04L 12/4035 370/442 |

OTHER PUBLICATIONS

International Search Report and Written Opinion—PCT/US2020/020896—ISAEPO—Jun. 3, 2020.

* cited by examiner

*Primary Examiner* — Brian T Misiura
(74) *Attorney, Agent, or Firm* — Muncy, Geissler, Olds & Lowe, P.C.

(57) ABSTRACT

Disclosed are ticketed flow control mechanisms in a processing system with one or more masters and one or more slaves. In an aspect, a targeted slave receives a request from a requesting master. If the targeted slave is unavailable to service the request, a ticket for the request is provided to the requesting master. As resources in the targeted slave become available, messages are broadcasted for the requesting master to update the ticket value. When the ticket value has been updated to a final value, the requesting master may retransmit the request.

44 Claims, 6 Drawing Sheets

| Command | | | Result | | | Comment |
|---|---|---|---|---|---|---|
| tktReceived | C2CtktReceived | tktClass | tktValid | C2CtktValid | tktClass | |
| 0 | 0 | --- | 0 | | | Initial Request, no ticket |
| | | | | 1 | 000 | Receives C2C low priority ticket |
| C2C issues sufficient tktDecrements for command to be re-issued | | | | | | |

| Command | | | Result | | | Comment |
|---|---|---|---|---|---|---|
| tktReceived | C2CtktReceived | tktClass | tktValid | C2CtktValid | tktClass | |
| 0 | 1 | --- | 1 | 0 | EPClass | Re-request redeeming C2C ticket. Receives Endpoint ticket |
| 1 | 0 | EPClass | | | | Re-request redeeming EP ticket. tktClass = EPClass |
| Endpoint issues sufficient tktDecrements for command to be re-issued | | | | | | |

| Command | | | Result | | | Comment |
|---|---|---|---|---|---|---|
| tktReceived | C2CtktReceived | tktClass | tktValid | C2CtktValid | tktClass | |
| 0 | 0 | 0 | | | | Initial Request, no ticket |
| | | | 1 | 0 | EPClass | Through C2C with no Ticket; Endpoint issues ticket |
| Endpoint issues sufficient tktDecrements for command to be re-issued | | | | | | |
| 1 | 0 | EPClass | 1 | | | Re-request redeeming EP ticket |
| | | | | 1 | 001 | Receives C2C high priority ticket |
| C2C issues sufficient tktDecrements for command to be re-issued | | | | | | |
| 1 | 1 | EPClass | | | | Re-request redeeming C2C and EP ticket. tktClass = EPClass |

FIG. 2C

TICKET BASED REQUEST FLOW CONTROL

CROSS-REFERENCE TO RELATED APPLICATIONS

The present application for patent claims the benefit of U.S. Provisional Application No. 62/813,542, entitled "TICKET BASED REQUEST FLOW CONTROL," filed Mar. 4, 2019, assigned to the assignee hereof, and expressly incorporated herein by reference in its entirety.

FIELD OF DISCLOSURE

Disclosed aspects pertain to traffic management and data flow control in a multiprocessor system.

BACKGROUND

Multiprocessor systems are computer systems that use two or more central processing units (CPU) within a single computer system. These multiple CPUs are in a close communication with each other, sharing the computer bus(es), memory system(s), and other peripheral devices. Multiprocessor systems are typically used when very high speed is desired to process a large volume of data.

The CPUs of a multiprocessor system, or more generally, masters, may utilize one or more memory controllers for interfacing with the memory systems, or more generally, slaves. There may be interconnect systems for traffic flow between the various masters and slaves, with points of serialization, such as common buses. Flow control methods are used in an attempt to allow access requests from the masters to reach targeted slaves in an efficient and balanced way.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of managing traffic in a processing system with one or more masters and one or more slaves includes receiving, at a targeted slave, a request from a requesting master, providing, by the targeted slave to the requesting master, a ticket having a ticket value having an initial value, broadcasting, by the targeted slave, one or more updates to the ticket value of the ticket to update the ticket value, and servicing, by the targeted slave, a retransmission of the request from the requesting master having a final ticket value for the ticket value of the ticket.

In an aspect, a method of managing traffic in a processing system with one or more masters and one or more slaves includes transmitting a request from a requesting master to a targeted slave, receiving, at the requesting master, a ticket for the request from the targeted slave to indicate that the targeted slave is unavailable to service the request, the ticket having a ticket value, receiving, at the requesting master, one or more broadcasted messages from the targeted slave to indicate that the ticket value is to be updated, updating the ticket value based on the one or more broadcasted messages, and retransmitting the request to the targeted slave when the ticket value has reached a final ticket value.

In an aspect, a targeted slave of a processing system with one or more masters and one or more slaves includes circuitry configured to receive a request from a requesting master, circuitry configured to provide, to the requesting master, a ticket having a ticket value having an initial value, circuitry configured to broadcast one or more updates to the ticket value of the ticket to update the ticket value, and circuitry configured to service a retransmission of the request from the requesting master having a final ticket value for the ticket value of the ticket.

In an aspect, a requesting master of a processing system with one or more masters and one or more slaves includes circuitry configured to transmit a request from a requesting master to a targeted slave, circuitry configured to receive a ticket for the request from the targeted slave to indicate that the targeted slave is unavailable to service the request, the ticket having a ticket value, circuitry configured to receive one or more broadcasted messages from the targeted slave to indicate that the ticket value is to be updated, circuitry configured to update the ticket value based on the one or more broadcasted messages, and circuitry configured to retransmit the request to the targeted slave when the ticket value has reached a final ticket value.

In an aspect, a targeted slave of a processing system with one or more masters and one or more slaves includes means for receiving a request from a requesting master, means for providing, to the requesting master, a ticket having a ticket value having an initial value, means for broadcasting one or more updates to the ticket value of the ticket to update the ticket value, and means for servicing a retransmission of the request from the requesting master having a final ticket value for the ticket value of the ticket.

In an aspect, a requesting master of a processing system with one or more masters and one or more slaves includes means for transmitting a request from a requesting master to a targeted slave, means for receiving a ticket for the request from the targeted slave to indicate that the targeted slave is unavailable to service the request, the ticket having a ticket value, means for receiving one or more broadcasted messages from the targeted slave to indicate that the ticket value is to be updated, means for updating the ticket value based on the one or more broadcasted messages, and means for retransmitting the request to the targeted slave when the ticket value has reached a final ticket value.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

FIGS. 2A-2C illustrate example sequences of commands and results in a ticketed flow control implementation, according to aspects of the disclosure.

DETAILED DESCRIPTION

Figure 1:
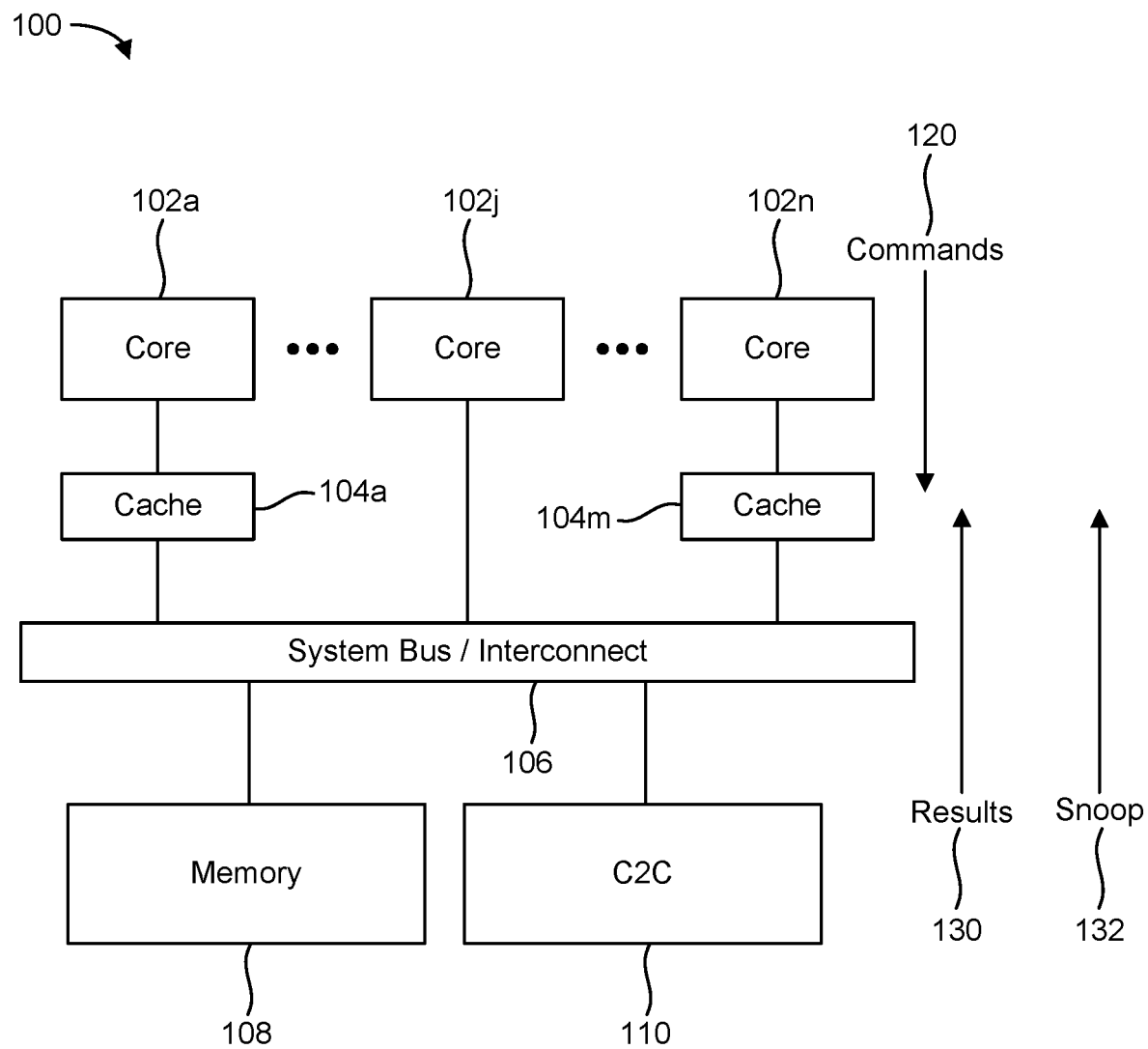
FIG. 1 is schematic view of an exemplary processing system configured according to aspects of the disclosure.

Aspects of the disclosure are provided in the following description and related drawings directed to specific aspects of the disclosure. Alternate aspects may be devised without departing from the scope of the disclosure. Additionally, well-known elements of the disclosure will not be described in detail or will be omitted so as not to obscure the relevant details of the disclosure.

The word "exemplary" is used herein to mean "serving as an example, instance, or illustration." Any aspect described herein as "exemplary" is not necessarily to be construed as preferred or advantageous over other aspects. Likewise, the term "aspects of the disclosure" does not require that all aspects of the disclosure include the discussed feature, advantage or mode of operation.

The terminology used herein is for the purpose of describing particular aspects only and is not intended to be limiting of the aspects of the disclosure. For example, as used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device, such as a multiprocessor system. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that, upon execution, would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As noted above, flow control methods are used in an attempt to allow access requests from masters (e.g., processors/cores) to reach targeted slaves (e.g., memory modules) in an efficient and balanced way. Conventional traffic flow management techniques, such as those relying on credit-based protocols, are impractical and inefficient for large systems. For example, a relatively small number of the points of serialization may be tasked with reserving credits for allowing requests from a large number of masters, which means that some requests may be backed up, thereby increasing round trip delays for requests to be processed, and also degrading performance or requiring increased resources and cost. Even on a lightly loaded system, this can restrict an active master from using idle credits.

Alternative techniques may avoid flow controls altogether and allow the masters to launch a request at any time. While this may be practical for lightly loaded systems, as traffic increases, the targeted slaves may quickly become overloaded, causing requests to be denied service, leading to retransmissions and imbalances in traffic flow across the system. Moreover, the masters that are forced to retransmit their requests may be operating blindly without knowledge of when their intended slaves would become available to service their requests, thus potentially launching the retransmissions too early (leading to more retransmissions) or too late (leading to performance penalties). Accordingly, there is a need for improved flow control mechanisms.

In exemplary aspects of the disclosure, a ticketed flow control mechanism is disclosed for improving traffic management in multiprocessing environments, for example. In exemplary aspects, masters (e.g., processors/cores) may launch requests for access to slaves (e.g., memory modules) at any point in time. When the requests reach their targeted slaves (or at some intermediate nodes, as will be further explained), the requests are accepted for servicing if the targeted slaves have availability. However, if a slave does not have the needed availability to service a request, then the requesting master is provided with a retry response, referred to as a "ticket," as a placeholder for the request. The ticket may be an individual ticket or a group ticket that groups multiple requests from one or more masters together. The ticket may include information pertaining to when the request may be retransmitted, and possibly other information that identifies the targeted slave (or the issuer of the ticket). Note that as used herein, a slave provides a "retry" response (i.e., a ticket) and a master "retransmits" the request.

FIG. 1 illustrates a schematic view of an exemplary processing system 100. Processing system 100 may be any special purpose or general purpose system-on-chip (SoC), for example. Processing system 100 may comprise one or more cores 102a-n, as shown. Cores 102a-n may be any agent, processor, or computing device, such as a CPU, digital signal processor (DSP), general purpose processor (GPP), field programmable gate array (FPGA), input/output device, interface device, etc. Some of cores 102a-n may have one or more caches and/or other local memory devices, representatively illustrated as caches 104a-m. Cores 102a-n and, where applicable, caches 104a-m, may be coupled to one another and to one or more slaves, including memory 108, slaves (not shown) connected through chip-to-chip (C2C) link 110, etc., through a system bus or interconnect 106. In an aspect, processing system 100 may be implemented as a multi-socket system that supports one or more sockets for connecting one or more off-chip memories or slaves, which may be accessed through links such as C2C link 110. Note that the illustrated arrangement of the components of processing system 100 is merely exemplary, and alternative arrangements and connections of the above-described components are within the scope of this disclosure.

Any of cores 102a-n or caches 104a-m may represent masters that may make a request to be serviced. For instance, if one of cores 102a-n makes a request that misses in one of caches 104a-m, that request may be forwarded to be serviced from memory 108. In some cases, misses may be retrieved from one or more off-chip memories or slaves (e.g., integrated on a separate chip from the one on which the one or more cores 102a-n are integrated), and servicing these misses may be through C2C link 110.

Interconnect 106 may use flow control mechanisms for forwarding the requests to slaves, such as memory 108 and/or C2C link 110. Memory 108 may have one or more memory banks or other memory subsystems that may be individually targeted and operable to service requests. A memory controller (not separately shown for the sake of simplicity) may be configured to control accesses to memory 108 and, specifically, to individual subsystems of memory 108. In some aspects, the memory controller may have separate queues, as is known in the art, for storing requests and data, each queue associated with a different bank or other subsystem. For example, availability to service requests by memory 108 may be determined based on space in the associated queues. As such, memory 108 may represent one or more slaves that may receive requests from one or more masters (e.g., one or more cores 102a-n). Also, as previously mentioned, one or more slaves may also be accessed through C2C link 110. As described herein, the one or more slaves may be configured to issue tickets to the one or more masters when they are unavailable to service requests immediately.

In FIG. 1, commands 120, results 130, and snoop 132 have been identified in conceptual directions to indicate, respectively, the commands flowing from the masters to the slaves (commands 120), the results, such as tickets, broadcast from the slaves to the masters (results 130), and ticket updates supplied according to this disclosure (snoop 132). Logically, commands 120, results 130, and snoop 132 may flow through respective command channels, results channels, and snoop channels, even though the command, results, and snoop channels may not be physically separate. The command channels, results channels, and snoop channels may be part of the interconnect system connecting the various masters and slaves of processing system 100 in FIG. 1.

In exemplary aspects, the ticket based flow control mechanism may be implemented in a suitable combination of the command channel, the results channel, and the snoop channel, as described below.

For example, a new request from one of the masters (the requesting master) for accessing one of the slaves (the targeted slave) may be sent on the command channel. The request may be delivered to and serviced by the targeted slave if the targeted slave has availability to accept and service the request. In that case, the result of such servicing may be provided on the results channel. In this case, the request operation is complete once the request has been delivered to/accepted by the targeted slave.

If, however, the targeted slave does not have availability and the request will need to be retransmitted, then the targeted slave may provide the requesting master with a ticket along with the retry indication on the results channel. In some cases, rather than an individual ticket for each master, a group ticket may be provided for improved efficiency and reduced costs/traffic. An individual ticket is a ticket for a single request, whereas a group ticket is a ticket for a group of multiple requests from one or more masters. The requesting master holds the request with the ticket and may not retransmit the request until the targeted slave indicates that it is now accepting requests for that ticket group that the requesting master holds.

The targeted slave may be identified in a request sent on the command channel, and optionally, a class to which the request belongs may also be included in the request. The class may represent whether the request is a read, a write, an associated priority, etc. When the targeted slave's resources become available, such that it can start accepting more requests, the targeted slave may provide a related indication by, for example, broadcasting a ticket decrement on the snoop channel to all masters, or, alternatively, to a selected subset of masters that may find the broadcast to be relevant.

The ticket decrement on the snoop channel may be associated with the source identifier (i.e., the identifier of the slave) of a ticket that a requesting master has been issued. When a master receives a ticket decrement indication from a targeted slave, the master decrements the ticket count for all tickets that the master holds from that slave that match the criteria indicated in the ticket decrement indication. In some cases, if the ticket decrement indication includes a group ticket identifier (ID), the decrement is performed for all group tickets that match the criteria indicated in the ticket decrement indication. Once the master's ticket count for the targeted slave reaches 0, the master may redeem the ticket and retransmit the request. Thus, when the requesting master's ticket count reaches 0 after one or more successive decrements of the ticket count from the targeted slave, the requesting master may retransmit the request to the targeted slave.

In an aspect, high priority requests, such as write-back operations, may be expedited by configuring the targeted slaves for these requests to maintain separate pools of tickets classified by their ticket class. The masters may also capture the ticket class, as mentioned above, with the ticket group number per class, comprising the source ID and the class identification.

The targeted slave's indication of the ticket class when tickets are distributed may be used by masters to determine their ticket class for future communications. Thus, the ticket class is provided when the ticket group decrement notification is broadcasted, and the requesting master indicates its ticket class when the requesting master retransmits the request (thereby redeeming the ticket once the master's group ticket number decrements to 0). As will be appreciated, decrementing ticket counts to zero is just one way of updating tickets to determine when they become redeemable, and there may be alternative methods to determine when a ticket becomes redeemable that are within the scope of the disclosure.

As previously mentioned, tickets may also be issued by one or more nodes or points of serialization, such as C2C link 110. For requests on the command channel, C2C link 110 may form a point of serialization when multiple requests are to be sent at the same time to memories or slaves connected to interconnect 106 through C2C link 110. In such cases, even before the request reaches a targeted slave through C2C link 110, intermediate ticketing mechanisms may be employed. This may form a multi-level ticketing mechanism, with one level of ticketing for C2C link 110 and another level of ticketing for the targeted slave connected through C2C link 110. Additional such levels of ticketing may also be nested or accumulated without deviating from the scope of this disclosure.

The following exemplary signaling may be used for implementing the above ticketing processes on the command channel, the results channel, and the snoop channel. A C2C ticket in the following description refers to a ticket for accessing C2C link 110 and a non-C2C ticket refers to a ticket generated by a targeted slave that is not available to readily service a request.

For the command channel, the following fields may be available for a command or request (e.g., a command 120) from a requesting master:
 RtyTktRequired: this field indicates whether a retry ticket is required or not.
 TktReceived: this field indicates whether the associated request has previously received a non-C2C ticket.
 TktClass[n-1:0]: this field indicates the class of ticket that was received from the targeted slave with the ticket.

This field may only be valid if TktReceived or C2CTktReceived are asserted.

C2CTktReceived: this field indicates whether the associated request has previously received a ticket from the C2C link.

From the slaves, tickets are broadcast on the results channel and ticket decrements on the snoop channel. For the tickets and ticket decrements on these channels, the following fields may be available:

TktValid: this field indicates whether a ticket has been assigned or not. This field is set to 0 if generated for a request that was sent on the command channel with RtyTktRequired de-asserted to indicate that a retry ticket is not required, or both RtryTktRequired and C2CTktValid are asserted (e.g., set to 1).

TktGrpCount: this field indicates the ticket group count, which is the number of decrements to be performed by a requesting master before the request can be retransmitted.

TktClass[n-1:0]: this field indicates the class of ticket, which may be used to differentiate command types (e.g., read, write, write-back) or priority classes.

TktSrcID: this field identifies the ticket source, or ticketer, that is, the ticket generating slave or other ticket issuing entity, used in the ticket decrement broadcast on the snoop channel to identify which requests' ticket group count is to be decremented.

C2CTktValid: this field indicates whether a C2C ticket has been assigned (where a ticket by a targeted slave and the C2C tickets for access to C2C link 110 are independent) or not. This field is set to 0 if generated in response to a request with RtyTktRequired deasserted or both RtryTktRequired and TktValid are asserted (e.g., set to 1). That is, TktValid and C2CTktValid are mutually exclusive when RtyTktRequired is asserted.

The relationship between TktValid, C2CTktValid, and RtyTktRequired is shown below in Table 1:

TABLE 1

|        | TktValid | C2CTktValid | RtyTkt Required |
|--------|----------|-------------|-----------------|
| Case 1 | 0        | 0           | 0               |
| Case 2 | 0        | 1           | 1               |
| Case 3 | 1        | 0           | 1               |

From the above signaling, it should be noted that C2C link 110 does not need a unique copy of TktGrpCount or TktSrcId in cases wherein tickets for both of the two levels, C2C link 110 and the targeted slave (or remote endpoint), are asserted/active at the same time.

Furthermore, in some cases, C2C link 110 does not require a unique ticket class signal because requests that have received a ticket from a targeted slave may be placed in a high priority class, while requests that have not been previously ticketed may be placed in a lower priority class. Whether or not this case is applicable and related information may be inferred from the TktValid fields. The masters may still keep track of both ticket levels for determining the decrementing (TktDecrement).

The following describes the handling of requests by a ticketer, such as a slave, or more generally, an endpoint (e.g., memory 108 or a slave connected through C2C link 110, etc.). When a request arrives at an endpoint that is not able to service or enqueue the request, the following scenarios are described.

If the request already has a ticket assigned, then the ticketer does not issue a new one; the master retains the same ticket that the master previously had. The ticket group count in the result is populated with 0 (for example). Note that new tickets may not be distributed for ticket group 0; therefore, when a master sees a result with 0 in the ticket group field, the master knows to retain the existing ticket group count that the master had previously received for that request.

If the request does not already have a ticket and the ticketer still has tickets remaining to distribute, the ticketer indicates in the retry result that the ticketer is distributing a ticket to the requesting master; the ticketer also indicates the ticket group number that can then be used by the master to know how many ticket group decrement notifications the master needs to see before retransmitting the same request. Note, however, that the master does not need to keep track of the number of decrement notifications that are received. Rather, the master may retransmit the request when a ticket count has decremented to zero.

If the request does not already have a ticket and the ticketer has no tickets remaining to distribute, then the ticketer indicates in the retry result that there are no tickets remaining (TktValid=0). The remaining ticket information (e.g., results 130 including the fields TktGrpCount, TktSrcID, TktClass, etc.) may be supplied by the ticketer when TktValid=0. The masters wait for the indicated number of decrements before retransmitting the request. The TktGrpCount given out when TktValid=0 is less than the number of TktDecrement commands that will eventually be sent.

When a C2C Ticketer (e.g., C2C link 110) issues a ticket, the C2C ticketer is responsible for reflecting TktReceived back as TktValid in the result. The C2C ticketer may also replace the TktGrpCount, TktSrcID, TktClass fields with the C2C ticketer values.

Tickets may be distributed in order, beginning with group '1,' for example. Once all of the group 1 tickets have been distributed, the ticketer may begin distributing tickets for group '2.' Once those all have been distributed, the ticketer may move to group '3,' and so on. The tickets may not be recycled until all existing tickets have been distributed. In other words, if the ticketer still has n tickets remaining in group j to distribute and has redeemed several tickets for group k (where k<j), then the ticketer may not re-distribute those redeemed tickets. Instead, once all of the tickets for group k have been redeemed, group k becomes the highest group (e.g., j+1 or j+2, etc.) and the tickets for group k may then be distributed accordingly.

Ticket group decrement command (TktDecrement) may be sent or broadcasted on the snoop channel as a field of snoop 132. No response is returned to the ticketer in response to this notification.

A targeted slave, or other endpoint, may send a ticket group decrement command marking group "X" as the group currently being serviced, while tickets remain outstanding for group X-1. A targeted slave, or other endpoint, may implement checks for ensuring that group X tickets do not repeatedly block group X-1 retransmitted requests to ensure forward progress. For example, if a ticketed request needs to be retransmitted, then a ticketer may stop sending early TktDecrements until all outstanding requests for the current group have been returned.

A ticketer may also implement mechanisms for reusing tickets for group counts that do not fill or fill slowly. For example, a group number may be reused once the number of outstanding tickets for the group is equal to or less than the available space in the ticketer for servicing the requests. In this case, the ticketer may not wait for all the tickets in the group to be distributed before reusing the tickets if the ticketer has enough resources to accept the outstanding requests in the group.

While a targeted slave, or other endpoint, may have tickets outstanding (i.e., tickets that have been distributed but not yet redeemed), the targeted slave may accept some number of requests that do not have a ticket, but reserve some number of resources to handle tickets that have been properly ticketed. The targeted slave may implement mechanisms to prevent resources of the targeted slave from being taken up for unticketed requests if the targeted slave has any tickets outstanding.

A ticketer may employ mechanisms with various granularity to track which masters or groups of masters need to see its/their ticket group decrement broadcasts. For example, the ticketer may track, using vectors, particular source IDs/groups that a requesting master may belong to, wherein the vector may be unique per ticket group, to enable the ticketer to know when to stop forwarding ticket group decrement notifications to the group comprising the requesting master. Each vector per group may be logically added (e.g., OR'ed together), and if any vector bit is ON, then the ticket group decrement notification may be sent to the respective group.

In an aspect, C2C link 110 may be treated as a special class of ticketer that may generate tickets for its own resources, as well as pass tickets through from other endpoint ticketers. To support a behavior where a master does not need to get in line repeatedly at C2C link 110, separate, or dedicated, fields for C2C link 110 and for other (non-C2C link) endpoints may be used. For example, all C2C ticketers may assert C2CTktValid, while all non-C2C ticketers may deassert C2CTktValid.

The following describes the requests made by a requesting master in greater detail. In an aspect, a master may, at the time of making a request, indicate whether or not it wants a ticket if the request needs to be retransmitted. When a master makes a request, the master may indicate whether it is attempting to redeem a ticket with that request (i.e., retransmitting a request having a fully decremented ticket value). When a master retransmits a request with a ticket, the master is expected to not change request attributes that would cause the request to be routed to a different endpoint (e.g., slave).

When a master receives a retry indication (e.g., a ticket), the master may store the ticket group count, ticket class, ticket source ID, and a suitable combination of TktValid and C2CTktValid indications, which are jointly referred to herein as *TktValid signals. The master may store C2C TktClass separately from the endpoint TktClass. In an aspect, if C2CTktValid=1, the TktClass is the C2C class, otherwise it is the endpoint TktClass.

If a master receives a retry indication without a valid ticket value (*TktValid=0), this may indicate that the ticketer is out of tickets. The remaining ticket information (TktGrpCount, TktSrcID, TktClass, etc.) will be valid when *TktValid=0. Thus, the master may be configured to wait for the indicated number of decrements before re-requesting (with TktReceived=0).

A master may begin monitoring the snoop channel for ticket decrement commands from the ticketer when the master has a group ticket number for an outstanding request. For each ticket decrement command broadcast that matches the request, the master may decrement the ticket group number by the received decrement value until the ticket group number reaches and stays at (saturates to) 0, as a group count may not be decremented below 0.

A master may be configured to wait to retransmit a request until the ticket group count reaches 0. When a request with a ticket arrives at a targeted slave, or ticketer, and the targeted slave is able to service or enqueue it, the ticket is said to be redeemed.

To ensure that processing system 100 does not run into errors or "hang" due to an apparent lack of resources, tickets are designed to be lossless. That is, once a ticket has been distributed by the ticketer for a request, that ticket is eventually returned to the ticketer so that the ticket may be subsequently reused for another request to that ticketer. A master that wishes to abandon a request may wait for the ticket group count to reach 0, then send the TktCancel command with the same address/attributes as the original request.

Said another way, the ticket cancel request (TktCancel) may be used by a master that has previously made a request and been given a group ticket. The disclosed ticketing scheme relies on conservation of tickets, so if a master received a ticket that it later wants to abandon, it should return the ticket to the endpoint. The master should wait until the count for its ticket has reached zero before sending this request. However, operations that are routed by command type (e.g., distributed virtual memory (DVM) and barriers, peer-to-peer (P2P), data cache clean and invalidate by realm key ID level 2 (DCCIRKIDL2) cache operations, etc.) may not issue a TktCancel since there may be insufficient information to route a cancellation request to the proper endpoint.

A ticketer that receives a request that has been retransmitted may reload the ticket fields, even if the master was redeeming a previously granted ticket. The ticketer is responsible for setting the group count properly in this case. This behavior allows the C2C ticketer to overlay a new group count value if necessary.

A master that retransmits a request to redeem a C2C ticket may use the endpoint TktClass if the request previously received an endpoint ticket. The C2C ticketer knows which class of ticket to redeem based on the value of TktReceived.

FIGS. 2A-C illustrate example sequences of commands 120 (i.e., requests) with associated results 130 for C2C tickets and endpoint tickets, according to aspects of the disclosure.

Specifically, FIG. 2A illustrates exemplary sequence 200 comprising a command 120 (e.g., a request sent by a master) and results 130 for a combined endpoint (e.g., slave) and C2C ticket in a case where C2C link 110 (the ticketer) sends the first ticket. In the command 120, the tktReceived and C2CtktReceived fields are set to "0," indicating that the command 120 is an initial request. In the result 130, the tktValid, C2CtktValid, and tktClass fields are set to "0," "1," and "000," respectively, indicating that the ticket is a low priority C2C ticket. In this case, C2C link 110 is shown to issue sufficient snoop 132 decrements for the command/request to be re-issued.

FIG. 2B illustrates exemplary sequence 210 comprising a command 120 (e.g., a request sent by a master) and results 130 for a combined endpoint (e.g., slave) and C2C ticket in a case where C2C link 110 (the ticketer) sends the first ticket. In the command 120, the tktReceived and C2CtktReceived fields are set to "0" and "1," respectively, indicating that the command 120 is a retransmitted request to redeem a C2C ticket. In the result 130, the tktValid, C2CtktValid, and tktClass fields are set to "1," "0," and "EPClass" (end point class), respectively, indicating that the ticket is for an endpoint. In this case, the endpoint is shown to issue sufficient snoop 132 decrements for the command/request to be retried/redeemed with the tktReceived, C2CtktReceived, and tktClass fields in the command 120 being set to "1," "0," and "EPClass," respectively.

FIG. 2C illustrates exemplary sequence 220 comprising a command 120 (e.g., a request sent by a master) and results 130 for a combined endpoint and C2C ticket in a case where the endpoint (the ticketer) sends the first ticket. In the command 120, the tktReceived, C2CtktReceived, and tkt-Class fields are set to "0," indicating an initial request. In the result 130, the tktValid, C2CtktValid, and tktClass fields are set to "1," "0," and "EPClass," respectively, indicating that the command 120 passed through C2C link 110 without C2C link 110 issuing a ticket, and instead the endpoint issued the ticket. The endpoint then issues sufficient decrements for the command/request to be retransmitted, and the master retransmits the request by issuing another command 120 having the tktReceived, C2CtktReceived, and tktClass fields set to "1," "0," and "EPClass," respectively, to indicate that the command 120 is a re-request to redeem the endpoint ticket. In the example of FIG. 2C, in the result 130, the tktValid, C2CtktValid, and tktClass fields areset to "1," "1," and "001," respectively, indicating that a high priority C2C ticket has been issued. The C2C then issues sufficient decrements for the combined C2C and endpoint command/request to be retried. The master can then issue another command 210 with the tktReceived, C2CtktReceived, and tktClass fields set to "1," "1," and "EPClass," respectively, indicating that the master is redeeming a C2C and endpoint ticket.

Figure 3:
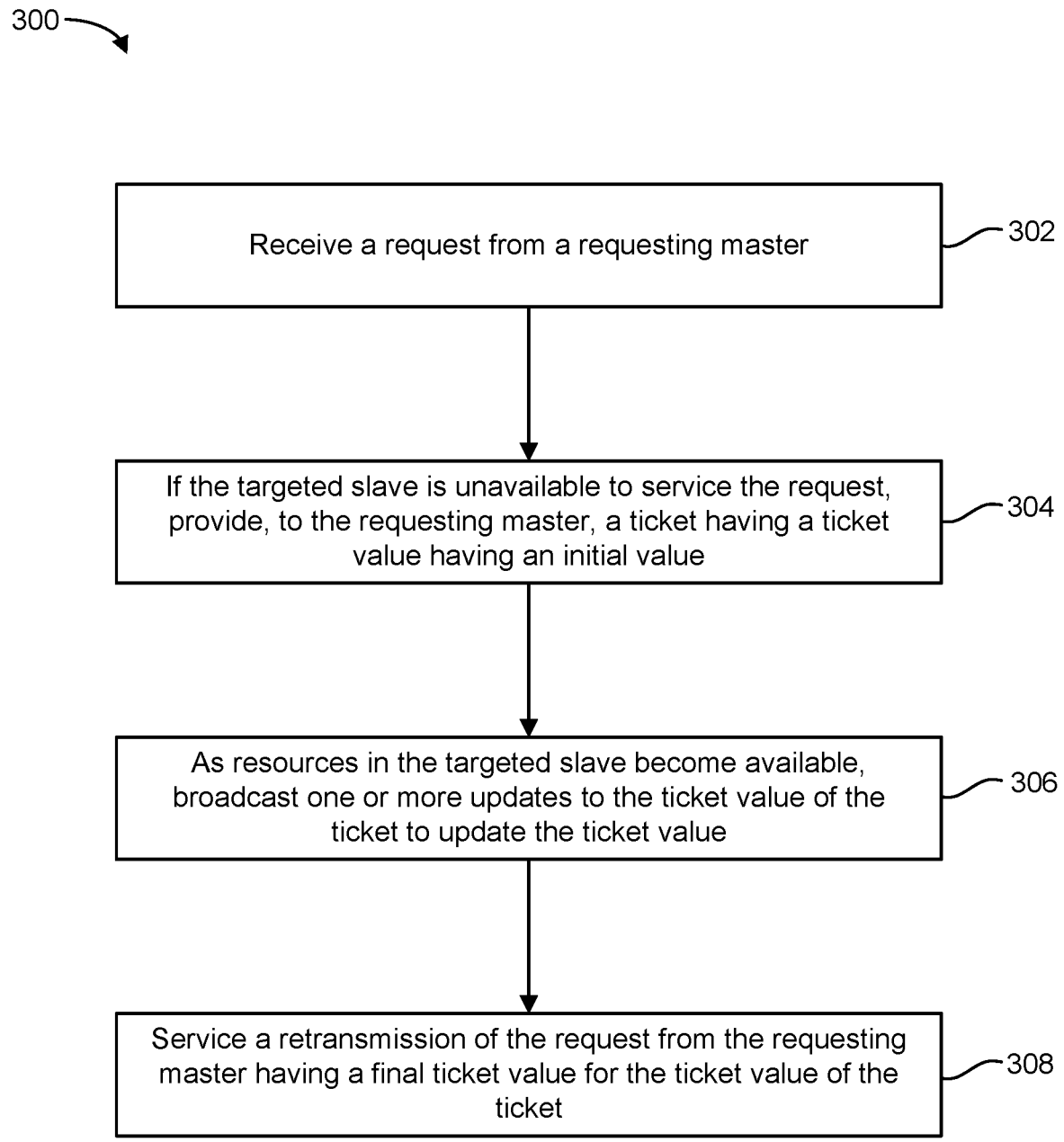
FIGS. 3 and 4 illustrate exemplary methods of traffic management, according to exemplary aspects.

It will be appreciated that exemplary aspects include various methods for performing the processes, functions, and/or algorithms disclosed herein. For example, FIG. 3 illustrates a method 300 of managing traffic in a processing system with one or more masters and one or more slaves (e.g., processing system 100). The method 300 may be performed by a targeted slave (e.g., memory 108, C2C link 110).

At 302, the targeted slave receives a request (e.g., a command 120 on the command channel) from a requesting master (e.g., core 102a-n).

At 304, if the targeted slave is unavailable to service the request, the targeted slave provides, to the requesting master, a ticket having a ticket value having an initial value (e.g., a value greater than "0"). The targeted slave may provide the ticket as a result 130 on the results channel.

At 306, as resources in the targeted slave become available, the targeted slave broadcasts one or more updates to the ticket value of the ticket to update (e.g., decrement) the ticket value. The targeted slave may broadcast the one or more updates to the requesting master as one or more snoops 132 on the snoop channel.

At 308, the targeted slave services a retransmission of the request from the requesting master having a final ticket value (e.g., a value of "0") for the ticket value of the ticket. The targeted slave may receive the repeated request as a command 120 on the command channel.

Figure 4:
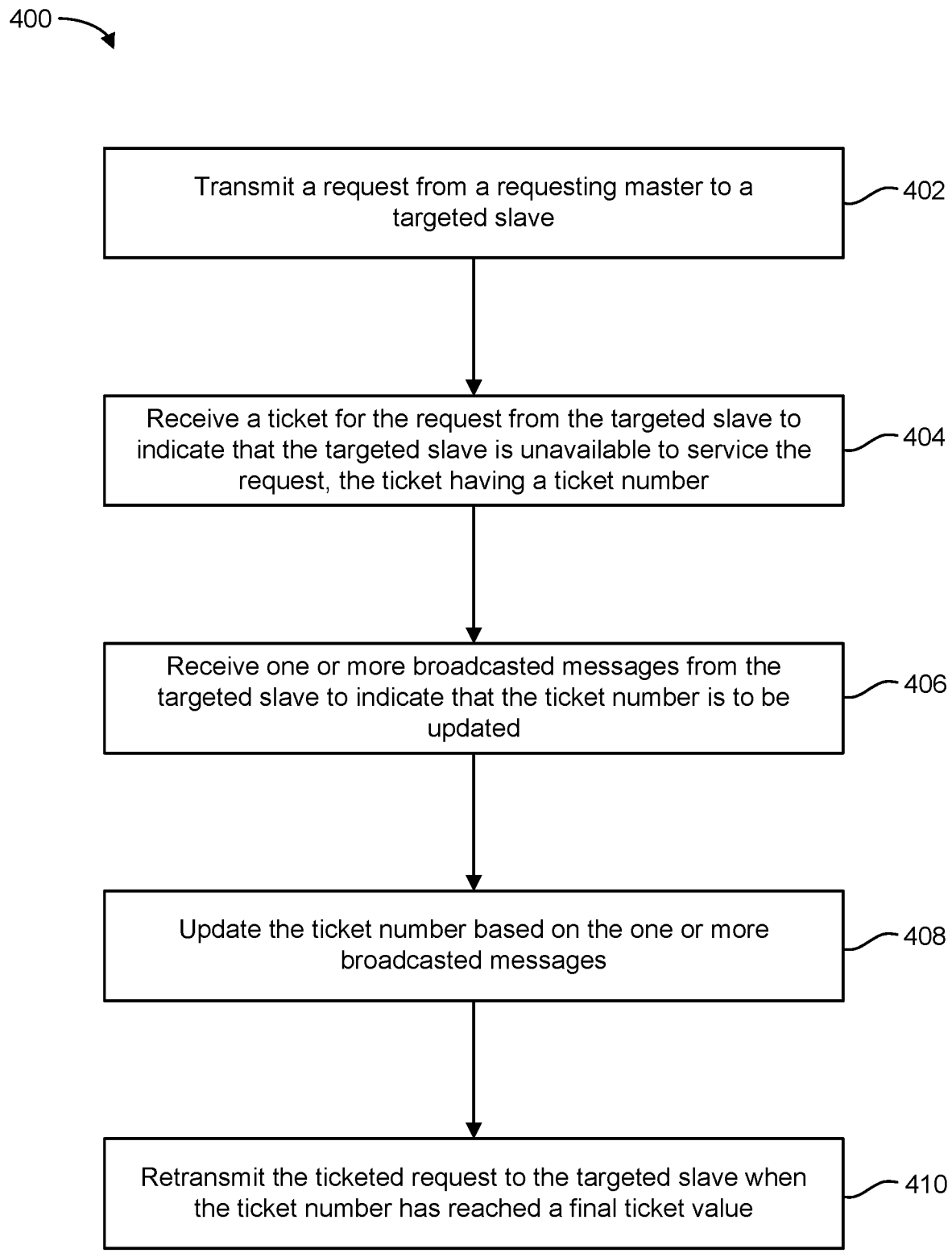

FIG. 4 illustrates another method 400 of managing traffic in a processing system with one or more masters and one or more slaves (e.g., processing system 100). The method 400 may be performed by a requesting master (e.g., core 102a-n).

At 402, the requesting master transmits a request (e.g., a command 120 on the command channel) from the requesting master (e.g., core 102a-n) to a targeted slave (e.g., memory 108, C2C link 110).

At 404, the requesting master receives a ticket (e.g., a result 130 on the results channel) for the request from the targeted slave to indicate that the targeted slave is unavailable to service the request, the ticket having a ticket value.

At 406, the requesting master receives one or more broadcasted messages (e.g., one or more snoops 132 on the snoop channel) from the targeted slave to indicate that the ticket value is to be updated.

At 408, the requesting master updates (e.g., decrements) the ticket value based on the one or more broadcasted messages.

At 410, the requesting master retransmits the ticketed request (e.g., as a command 120 on the command channel) to the targeted slave when the ticket value has reached a final ticket value (e.g., has been decremented to zero).

Figure 5:
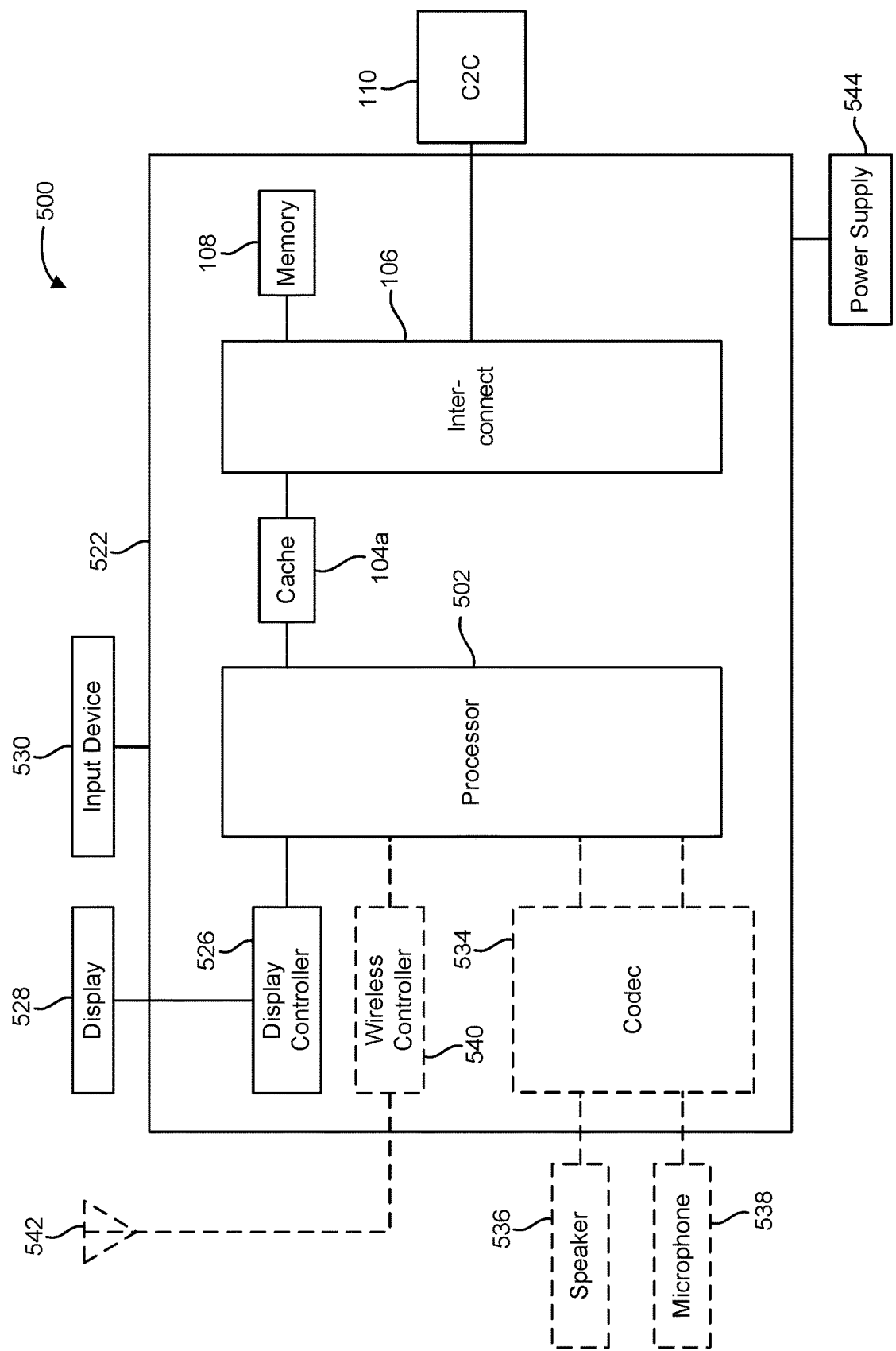
FIG. 5 illustrates a computing device in which aspects of the disclosure may be employed.

An example apparatus in which exemplary aspects of this disclosure may be utilized is shown in FIG. 5. FIG. 5 shows a block diagram of an exemplary computing device 500, which includes processor 502, which may be a master, configured as one of cores 102a-n, and specifically, in the example of FIG. 5, core 102a in FIG. 1. Correspondingly, cache 104a, interconnect 106, memory 108, and C2C link 110 discussed in relation to FIG. 1 are also shown (with C2C link 110 shown external to computing device 500 to conceptually illustrate that C2C link 110 may provide a connection to off-chip devices). Numerous other details of processing system 100 shown in FIG. 1 may be applicable to FIG. 5, but these details have been omitted in the description of FIG. 5 for the sake of clarity, and it will be understood that they may be configured similarly as described with reference to FIG. 1. In an aspect, computing device 500 may be configured to perform the methods 300 and 400 of FIGS. 3 and 4, respectively.

In FIG. 5, processor 502 is shown to be communicatively coupled to memory 108 (e.g., via cache 104a and interconnect 106 in the example of FIG. 5). FIG. 5 also shows a display controller 526 that is coupled to processor 502 and to display 528.

In some aspects, computing device 500 may include some optional blocks shown with dashed lines. For example, computing device 500 may optionally include coder/decoder (CODEC) 534 (e.g., an audio and/or voice CODEC) coupled to processor 502; speaker 536 and microphone 538 coupled to CODEC 534; and wireless controller 540 (which may include a modem) coupled to wireless antenna 542 and to processor 502.

In a particular aspect, where one or more of the above-mentioned optional blocks are present, processor 502, display controller 526, memory 108, CODEC 534, and wireless controller 540 can be included in a system-in-package or system-on-chip device 522. Input device 530, power supply 544, display 528, speaker 536, microphone 538, wireless antenna 542, power supply 544, and C2C link 110 may be external to system-on-chip device 522, and may be coupled to one or more components of system-on-chip device 522, such as an interface or a controller.

It should be noted that although FIG. 5 generally depicts a computing device 500, processor 502 and memory 108 may also be integrated into a set top box, a music player, a server, a video player, an entertainment unit, a gaming device, a navigation device, a personal digital assistant (PDA), a fixed location data unit, a computer, a laptop computer, a tablet computer, a communications device, a mobile phone, or other similar devices.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a compact disk (CD), a digital video disk (DVD), or any other form of storage medium known in the art. An exemplary storage medium may be coupled to a processor such that the processor can read information from, and write information to, the storage medium. In the alternative, the storage medium may be integral to the processor.

Accordingly, an aspect of the disclosure can include a computer readable media embodying a method for managing traffic in a processing system. Accordingly, the disclosure is not limited to illustrated examples and any means for performing the functionality described herein are included in aspects of the disclosure.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of managing traffic in a processing system with one or more masters and one or more slaves, the method comprising:
   receiving, at a targeted slave, a request from a requesting master, the request indicating that a ticket is required if the request needs to be retransmitted;
   providing, by the targeted slave to the requesting master, the ticket having a ticket value having an initial value;
   broadcasting, by the targeted slave, one or more updates to the ticket value of the ticket to update the ticket value; and
   servicing, by the targeted slave, a retransmission of the request from the requesting master having a final ticket value for the ticket value of the ticket, the final ticket value being different from the initial value.

2. The method of claim 1, wherein the targeted slave provides the ticket based on the targeted slave being unavailable to service the request.

3. The method of claim 1, wherein the targeted slave provides the ticket based on the targeted slave being unavailable to service new requests having a same class as the request.

4. The method of claim 1, wherein the targeted slave broadcasts the one or more updates to the ticket value as resources in the targeted slave become available.

5. The method of claim 1, wherein the targeted slave receives the retransmission of the request when the ticket value of the ticket has been decremented to the final ticket value.

6. The method of claim 1, wherein the request includes a field indicating a ticket class of the ticket.

7. The method of claim 6, wherein the ticket value is independent of the ticket class.

8. The method of claim 1, wherein the targeted slave assigns the request to a high priority class based on the request having been previously ticketed.

9. The method of claim 1, wherein the request is a high priority request, and wherein the targeted slave maintains a separate pool of tickets for high priority requests.

10. The method of claim 1, wherein the targeted slave is a memory module, and wherein the requesting master is a processor.

11. The method of claim 10, wherein the memory module and the processor are components of a cellular telephone, a personal digital assistant (PDA), a laptop computer, a tablet computer, a desktop computer, a server, a set top box, a music player, a video player, an entertainment unit, a navigation device, a gaming device, or a fixed location data unit.

12. A method of managing traffic in a processing system with one or more masters and one or more slaves, the method comprising:
    transmitting a request from a requesting master to a targeted slave, the request indicating that a ticket is required if the request needs to be retransmitted;
    receiving, at the requesting master, the ticket for the request from the targeted slave to indicate that the targeted slave is unavailable to service the request, the ticket having a ticket value having an initial value;
    receiving, at the requesting master, one or more broadcasted messages from the targeted slave to indicate that the ticket value is to be updated;
    updating, by the requesting master, the ticket value based on the one or more broadcasted messages; and
    retransmitting, by the requesting master, the request to the targeted slave when the ticket value has reached a final ticket value different from the initial value.

13. The method of claim 12, wherein the requesting master receives the ticket based on the targeted slave being unavailable to service new requests having a same class as the request.

14. The method of claim 12, wherein the requesting master receives the one or more broadcasted messages as resources in the targeted slave become available.

15. The method of claim 12, wherein the requesting master retransmits the request when the ticket value of the ticket has been decremented to the final ticket value.

16. The method of claim 12, wherein the request is a high priority request, and wherein the targeted slave maintains a separate pool of tickets for high priority requests.

17. The method of claim 12, wherein the request includes a field indicating a ticket class of the ticket.

18. The method of claim 17, wherein the ticket value is independent of the ticket class.

19. The method of claim 12, wherein the request is placed in a high priority class based on the request having been previously ticketed.

20. The method of claim 12, wherein the targeted slave is a memory module, and wherein the requesting master is a processor.

21. The method of claim 20, wherein the memory module and the processor are components of a cellular telephone, a personal digital assistant (PDA), a laptop computer, a tablet computer, a desktop computer, a server, a set top box, a music player, a video player, an entertainment unit, a navigation device, a gaming device, or a fixed location data unit.

22. A targeted slave of a processing system with one or more masters and one or more slaves, comprising:
   circuitry configured to receive a request from a requesting master, the request indicating that a ticket is required if the request needs to be retransmitted;
   circuitry configured to provide, to the requesting master, the ticket having a ticket value having an initial value;
   circuitry configured to broadcast one or more updates to the ticket value of the ticket to update the ticket value; and
   circuitry configured to service a retransmission of the request from the requesting master having a final ticket value for the ticket value of the ticket, the final ticket value being different from the initial value.

23. The targeted slave of claim 22, wherein the targeted slave provides the ticket based on the targeted slave being unavailable to service the request.

24. The targeted slave of claim 22, wherein the targeted slave provides the ticket based on the targeted slave being unavailable to service new requests having a same class as the request.

25. The targeted slave of claim 22, wherein the targeted slave broadcasts the one or more updates to the ticket value as resources in the targeted slave become available.

26. The targeted slave of claim 22, wherein the targeted slave receives the retransmission of the request when the ticket value of the ticket has been decremented to the final ticket value.

27. The targeted slave of claim 22, wherein the request includes a field indicating a ticket class of the ticket.

28. The targeted slave of claim 27, wherein the ticket value is independent of the ticket class.

29. The targeted slave of claim 22, wherein the targeted slave assigns the request to a high priority class based on the request having been previously ticketed.

30. The targeted slave of claim 22, wherein the request is a high priority request, and wherein the targeted slave maintains a separate pool of tickets for high priority requests.

31. The targeted slave of claim 22, wherein the targeted slave is a memory module, and wherein the requesting master is a processor.

32. The targeted slave of claim 31, wherein the memory module and the processor are components of a cellular telephone, a personal digital assistant (PDA), a laptop computer, a tablet computer, a desktop computer, a server, a set top box, a music player, a video player, an entertainment unit, a navigation device, a gaming device, or a fixed location data unit.

33. A requesting master of a processing system with one or more masters and one or more slaves, comprising:
   circuitry configured to transmit a request to a targeted slave, the request indicating that a ticket is required if the request needs to be retransmitted;
   circuitry configured to receive a ticket for the request from the targeted slave to indicate that the targeted slave is unavailable to service the request, the ticket having a ticket value having an initial value;
   circuitry configured to receive one or more broadcasted messages from the targeted slave to indicate that the ticket value is to be updated;
   circuitry configured to update the ticket value based on the one or more broadcasted messages; and
   circuitry configured to retransmit the request to the targeted slave when the ticket value has reached a final ticket value different from the initial value.

34. The requesting master of claim 33, wherein the requesting master receives the ticket based on the targeted slave being unavailable to service new requests having a same class as the request.

35. The requesting master of claim 33, wherein the requesting master receives the one or more broadcasted messages as resources in the targeted slave become available.

36. The requesting master of claim 33, wherein the requesting master retransmits the request when the ticket value of the ticket has been decremented to the final ticket value.

37. The requesting master of claim 33, wherein the request is a high priority request, and wherein the targeted slave maintains a separate pool of tickets for high priority requests.

38. The requesting master of claim 33, wherein the request includes a field indicating a ticket class of the ticket.

39. The requesting master of claim 38, wherein the ticket value is independent of the ticket class.

40. The requesting master of claim 33, wherein the request is placed in a high priority class based on the request having been previously ticketed.

41. The requesting master of claim 33, wherein the targeted slave is a memory module, and wherein the requesting master is a processor.

42. The requesting master of claim 41, wherein the memory module and the processor are components of a cellular telephone, a personal digital assistant (PDA), a laptop computer, a tablet computer, a desktop computer, a server, a set top box, a music player, a video player, an entertainment unit, a navigation device, a gaming device, or a fixed location data unit.

43. A targeted slave of a processing system with one or more masters and one or more slaves, comprising:
   means for receiving a request from a requesting master, the request indicating that a ticket is required if the request needs to be retransmitted;
   means for providing, to the requesting master, the ticket having a ticket value having an initial value;
   means for broadcasting one or more updates to the ticket value of the ticket to update the ticket value; and
   means for servicing a retransmission of the request from the requesting master having a final ticket value for the ticket value of the ticket, the final ticket value being different from the initial value.

44. A requesting master of a processing system with one or more masters and one or more slaves, comprising:
   means for transmitting a request from to a targeted slave, the request indicating that a ticket is required if the request needs to be retransmitted;

means for receiving the ticket for the request from the targeted slave to indicate that the targeted slave is unavailable to service the request, the ticket having a ticket value having an initial value;

means for receiving one or more broadcasted messages from the targeted slave to indicate that the ticket value is to be updated;

means for updating the ticket value based on the one or more broadcasted messages; and means for retransmitting the request to the targeted slave when the ticket value has reached a final ticket value different from the initial value.

\* \* \* \* \*